United States Patent
Terada et al.

(10) Patent No.: US 7,349,301 B2
(45) Date of Patent: Mar. 25, 2008

(54) WRITE-ONCE RECORDING MEDIUM ON WHICH PORTION OF THE DATA IS LOGICALLY OVERWRITTEN

(75) Inventors: Mitsutoshi Terada, Kanagawa (JP); Shoei Kobayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 366 days.

(21) Appl. No.: 10/501,403

(22) PCT Filed: Nov. 19, 2003

(86) PCT No.: PCT/JP03/14719

§ 371 (c)(1),
(2), (4) Date: Jul. 15, 2004

(87) PCT Pub. No.: WO2004/049332

PCT Pub. Date: Jun. 10, 2004

(65) Prior Publication Data

US 2005/0083767 A1  Apr. 21, 2005

(30) Foreign Application Priority Data

Nov. 22, 2002 (JP) ............................. 2002-339094

(51) Int. Cl.
*G11B 7/24* (2006.01)
(52) U.S. Cl. .................... 369/47.13; 714/758
(58) Field of Classification Search ............ 369/47.14, 369/53.17, 47.13; 714/758
See application file for complete search history.

(56) References Cited

U.S. PATENT DOCUMENTS 6,094,723 A * 7/2000 Otsuka ..................... 726/31
6,160,778 A * 12/2000 Ito et al. .................. 369/53.15
6,168,321 B1 * 1/2001 Tanaka et al. .............. 717/168
6,182,004 B1 * 1/2001 Komori ..................... 701/114
6,581,167 B1 * 6/2003 Gotoh et al. .................. 714/7
6,615,363 B1 * 9/2003 Fukasawa ..................... 714/5
6,901,549 B2 * 5/2005 March et al. ............... 714/758
7,088,648 B2 * 8/2006 Park et al. ............... 369/47.14

FOREIGN PATENT DOCUMENTS

JP   3-46164    2/1991
JP   6-338139   12/1994

\* cited by examiner

*Primary Examiner*—Gautam R. Patel
(74) *Attorney, Agent, or Firm*—Oblon, Spivak, McClelland, Maier & Neustadt, P.C.

(57) ABSTRACT

A recording medium that is a write-once recording medium with data rewritability, thereby increasing the usability of the write-once recording medium, is provided. In a write-once recording medium, a main data area has a normal record and playback sub-area (a user data section), a rewriting replacement sub-area (an OSA), and a replacement management sub-area (an ISA). In response to a request to write data to an address at which data has been recorded, the rewritten data is recorded in the rewriting replacement sub-area (the OSA), and replacement management information that associates the original address with the address in the rewriting replacement sub-area is recorded into the replacement management sub-area (the ISA). Thus, data rewriting is achieved. Accordingly, a write-once recording medium can be substantially used as a data rewritable recording medium.

7 Claims, 11 Drawing Sheets

FIG. 2

DMA1

| [CLUSTER NO.] | | [NUMBER OF CLUSTERS] |
|---|---|---|
| CL1 | DDS#1 | 1 |
| CL2 | DDS#2 | 1 |
| CL3 | DDS#3 | 1 |
| CL4 | DDS#4 | 1 |
| CL5 | DDS#5 | 1 |
| ... | ... | |
| CL32 | DDS#32 | 1 |

DMA2

| [CLUSTER NO.] | | [NUMBER OF CLUSTERS] |
|---|---|---|
| CL1 | DDS#33 | 1 |
| CL2 | DDS#34 | 1 |
| CL3 | DDS#35 | 1 |
| CL4 | DDS#36 | 1 |
| CL5 | DDS#37 | 1 |
| ... | ... | |
| CL32 | DDS#64 | 1 |

FIG. 4

| BYTE POSITION | DESCRIPTION | NUMBER OF BYTES |
|---|---|---|
| 0~1 | DDS IDENTIFIER = "DS" | 2 |
| 2 | DDS FORMAT NUMBER | 1 |
| 3 | RESERVED, 00h | 1 |
| 4~31 | RESERVED, ALL 00h | 28 |
| 32~35 | START PHYSICAL SECTOR ADDRESS OF USER DATA SECTION | 4 |
| 36~39 | END LOGICAL SECTOR ADDRESS OF USER DATA SECTION | 4 |
| 40~43 | SIZE OF INNER SPARE AREA (ISA) | 4 |
| 44~47 | SIZE OF OUTER SPARE AREA (OSA) | 4 |
| 48~51 | RESERVED, ALL 00h | 4 |
| 52 | SPARE-AREA AVAILABILITY FLAG | 1 |
| 53~55 | RESERVED, ALL 00h | 3 |
| 56~2047 | RESERVED, ALL 00h | 1992 |
| 2048~65535 | RESERVED, ALL 00h | 63488 |

ONE CLUSTER

| BYTE POSITION | DESCRIPTION | NUMBER OF BYTES |
|---|---|---|
| 0~63 | LIST MANAGEMENT INFORMATION | 64 |
| 64~71 | ADDRESS TRANSFER INFORMATION ati #1 | 8 |
| 72~135 | ADDRESS TRANSFER INFORMATION ati #2 | 8 |
| : | : | : |
| : | ADDRESS TRANSFER INFORMATION ati #N (N≧0) | 8 |
| (N×8+64)~65535 | RESERVED, ALL 00h | 65536-(N×8+64) |

ONE CLUSTER

FIG. 7

| BYTE POSITION | DESCRIPTION | NUMBER OF BYTES |
|---|---|---|
| 0~1 | ATL IDENTIFIER ="AL" | 2 |
| 2 | ATL FORMAT NUMBER | 1 |
| 3~11 | RESERVED, ALL 00h | 9 |
| 12~15 | NUMBER OF PIECES OF ADDRESS TRANSFER INFORMATION REGISTERED (N) | 4 |
| 16~23 | RESERVED, ALL 00h | 8 |
| 24~27 | NUMBER OF CLUSTERS AVAILABLE IN OSA | 4 |
| 28~63 | RESERVED, ALL 00h | 36 |

64 BYTES

FIG. 8

8 BYTES

| b63 ··· b60 | b59 ··· b32 | b31 ··· b28 | b27 ··· b0 |
|---|---|---|---|
| RESERVED, 0000b | ORIGINAL PHYSICAL SECTOR ADDRESS | RESERVED, 0000b | REPLACED PHYSICAL SECTOR ADDRESS |

WRITE-ONCE RECORDING MEDIUM ON WHICH PORTION OF THE DATA IS LOGICALLY OVERWRITTEN

TECHNICAL FIELD

The present invention relates to recording media, particularly, write-once media, including an optical disk, and to a recording apparatus, a recording method, a playback apparatus, and a playback method for such recording media.

BACKGROUND ART

One technique for recording and playing back digital data is a data recording technique using, for example, an optical disk (including a magneto-optical disk), such as a CD (Compact Disk), an MD (Mini-Disk), or a DVD (Digital Versatile Disk), as a recording medium. Optical disk is a general term for recording media of the type in which a disc of a thin metal plate protectively coated with plastic is irradiated with laser light and a change in the reflected light is used to capture a signal.

Optical disks include, for example, playback-only disks known as CD, CD-ROM, DVD-ROM, and so forth, and user-data-recordable disks known as MD, CD-R, CD-RW, DVD-R, DVD-RW, DVD+RW, DVD-RAM, and so forth. The recordable disks employ the magneto-optical recording method, the phase-change recording method, the dye-change recording method, and so on to record data. The dye-change recording method is also referred to as a write-once recording method, which provides one-time-data-recordable and non-rewritable media. This is suitable for data preservation purposes and the like. On the other hand, the magneto-optical recording method and the phase-change recording method, which enable data to be rewritten, are employed for various applications, such as recording of various types of content data including music, motion pictures, games, and application programs.

Recently, high-density optical disks, referred to as DVR (Data & Video Recording), have been developed to achieve remarkably large capacity disks.

For example, in recently developed high-density disks, data recording and playback is conducted under the conditions wherein a laser (so-called blue laser) having a wavelength of 405 nm is combined with an objective lens having an NA (numerical aperture) of 0.85. In this case, about 23.3 GB (gigabytes) of data can be recorded and played back on a 12-cm-diameter disk with a format efficiency of about 82% at a track pitch of 0.32 μm and a linear density of 0.12 μm/bit in recording and playback units of 64-KB (kilobyte) data blocks.

High-density write-once or rewritable disks have also been developed.

In order to record data onto a recordable disk that employs the magneto-optical recording method, the dye-change recording method, the phase-change recording method, or the like, tracking guide means for a data track is required. Thus, a pregrooved disk, or a disk having grooves formed in advance, is used, and the grooves or lands (plateau portions in cross section between the grooves) are used as data tracks.

Furthermore, address information must be recorded in order to record data in position on a data track. In some cases, the address information is recorded using wobbled grooves.

Specifically, the track onto which data is to be recorded is formed in advance as, for example, a pregroove, and the sidewall of the pregroove is wobbled according to address information.

During recording or playback, the address is read from the wobble information that is obtained as reflected-light information. Thus, data can be recorded and played back in a desired position, for example, even when pit data or the like that indicates an address is not formed in advance on a track.

The address information added as wobbled grooves prevents the need for, for example, discrete address areas on the tracks to record addresses as, for example, pit data. The address areas are no longer necessary, and therefore, the recording capacity of live data becomes large.

The absolute-time (address) information expressed by the wobbled grooves is referred to ATIP (Absolute Time In Pregroove) or ADIP (Adress In Pregroove).

One known technique for such data-recordable (not playback-only) recording media is that a spare area is provided for replacing the area in which data is recorded on the disk. This is a defective-area management technique for performing appropriate recording and playback operations using a spare recording area in place of a portion unsuitable for data recording due to a defect on a disk, such as a scratch.

One defective-area managing technique is disclosed in, for example, PCT Japanese Translation Patent Publication No. 2002-521786.

In one-time recordable optical recording media, such as a CD-R, a DVD-R, and a high-density write-once disk, it is impossible to record data onto a recorded area.

Most file systems to be recorded onto optical recording media are specified on the assumption that the file systems are used on non-recordable playback-only media (ROM-type disks) or rewritable media (RAM-type disks). The file systems for one-time recordable media, i.e., write-once recording media, are specified so that certain functions are limited while special functions are added.

This is the reason that the file systems for write-once optical recording media are not widely popular. For example, FAT (File Allocation Table) file systems compatible with various types of OS in information processing devices cannot be immediately used for the write-once media.

Write-once media are suitable for data preservation and the like and are widely used. If write-once media is also capable of supporting the FAT file systems described above without changing the general specification thereof, write-once media would provide higher usability.

However, in order to immediately use widely accepted file systems, such as FAT file systems, or the RAM or hard-disk file systems, the capability of writing data at the same address, i.e., data rewritability, is essential. As is known, one of the features of the write-once media is non-rewritability, and it is therefore impossible to immediately use the file systems described above that are used for rewritable recording media.

DISCLOSURE OF INVENTION

In view of such a situation, it is an object of the present invention to provide a write-once recording medium with data rewritability, thereby increasing the usability of the write-once recording medium.

The present invention provides a recording medium having a main data area that is a write-once recordable section in which data is writable once, and a management/control area in which management/control information for recording and playing back data on the main data area is recorded. The main data area includes a normal record and playback sub-area in which data is recorded and played back, a rewriting replacement sub-area into which rewritten data is recorded in response to a request to rewrite the data recorded in the normal record and playback sub-area, and a replacement management sub-area in which replacement management information between the data that is to be updated in the normal record and playback sub-area according to a rewrite request and the rewritten data that is recorded in the rewriting replacement sub-area in response to the rewrite request is recorded.

The sizes of the rewriting replacement sub-area and the replacement management sub-area are defined by the management/control information recorded in the management/control area.

The management/control information recorded in the management/control area includes information indicating whether or not the rewriting replacement sub-area and the replacement management sub-area are available.

The management/control area is a write-once recordable section in which data is writable once, and includes a management/control-information placement sub-area for updating the management/control information for the rewriting replacement sub-area and the replacement management sub-area.

The present invention further provides a recording apparatus for a recording medium having a write-once recordable section in which data is writable once, the write-once recordable section including a main data area and a management/control area in which management/control information for recording and playing back data on the main data area is recorded. The recording apparatus includes writing means for writing data, and formatting control means. The formatting control means causes the writing means to record the management/control information in the management/control area so that the following sub-areas are formed in the main data area: a normal record and playback sub-area in which data is recorded and played back, a rewriting replacement sub-area into which rewritten data is recorded in response to a request to rewrite the data recorded in the normal record and playback sub-area, and a replacement management sub-area in which replacement management information between the data that is to be updated in the normal record and playback sub-area according to a rewrite request and the rewritten data that is recorded in the rewrite replacement sub-area in response to the rewrite request is recorded.

The present invention further provides a recording apparatus for a recording medium having a main data area that is a write-once recordable section in which data is writable once, and a management/control area in which management/control information for recording and playing back data on the main data area is recorded, the main data area including a normal record and playback sub-area in which data is recorded and played back, a rewriting replacement sub-area into which rewritten data is recorded in response to a request to rewrite the data recorded in the normal record and playback sub-area, and a replacement management sub-area in which replacement management information between the data that is to be updated in the normal record and playback sub-area according to a rewrite request and the rewritten data that is recorded in the rewriting replacement sub-area in response to the rewrite request recorded. The recording apparatus includes writing means for writing data, confirming means for, upon a request to write data to the main data area, confirming whether or not the address specified by the write request is an address at which data has been recorded, determining means for, when the confirming means confirms that the address is an address at which data has been recorded, determining whether or not the data is rewritable and recordable using the rewriting replacement sub-area and the replacement management sub-area, and write control means. When the confirming means confirms that the address specified by the write request is an address at which no data has been recorded, the write control means controls the writing means so as to write the data to the address specified by the write request. When the confirming means confirms that the address specified by the write request is an address at which data has been recorded and when the determining means determines that the data is rewritable and recordable, the write control means controls the writing means so as to write the data in accordance with the write request to the rewriting replacement sub-area while recording the replacement management information into the replacement management sub-area.

The present invention further provides a playback apparatus for a recording medium having a main data area that is a write-once recordable section in which data is writable once, and a management/control area in which management/control information for recording and playing back data on the main data area is recorded, the main data area including a normal record and playback sub-area in which data is recorded and played back, a rewriting replacement sub-area into which rewritten data is recorded in response to a request to rewrite the data recorded in the normal record and playback sub-area, and a replacement management sub-area in which replacement management information between the data that is to be updated in the normal record and playback sub-area according to a rewrite request and the rewritten data that is recorded in the rewriting replacement sub-area in response to the rewrite request is recorded. The playback apparatus includes reading means for reading data, confirming means for, upon a request to read data from the main data sub-area, confirming whether or not the address specified by the read request is an address at which data has been rewritten, and read control means. When the confirming means confirms that the address specified by the read request is not an address at which data has been rewritten, the read control means controls the reading means so as to read the data from the address specified by the read request. When the confirming means confirms that the address specified by the read request is an address at which data has been rewritten, the read control means controls the reading means so as to read the data in accordance with the read request from the rewriting replacement sub-area based on the replacement management information recorded in the replacement management sub-area.

The present invention further provides a recording method for recording data onto a recording medium having a write-once recordable section in which data is writable once, the write-once recordable section including a main data area and a management/control area in which management/control information for recording and playing back data on the main data area is recorded, wherein the management/control information is recorded in the management/control area so that the following sub-areas are formed in the main data area: a normal record and playback sub-area in which data is recorded and played back, a rewriting replacement sub-area into which rewritten data is recorded in response to a request to rewrite the data recorded in the normal record and playback sub-area, and a replacement management sub-area in which replacement management information between the data that is to be updated in the normal record and playback sub-area according to a rewrite request and the rewritten data that is recorded in the rewriting replacement sub-area in response to the rewrite request is recorded.

The present invention further provides a recording method for recording data onto a recording medium having a main data area that is a write-once recordable section in which data is writable once, and a management/control area in which management/control information for recording and playing back data on the main data area is recorded, the main data area including a normal record and playback sub-area in which data is recorded and played back, a rewriting replacement sub-area into which rewritten data is recorded in response to a request to rewrite the data recorded in the normal record and playback sub-area, and a replacement management sub-area in which replacement management information between the data that is to be updated in the normal record and playback sub-area according to a rewrite request and the rewritten data that is recorded in the rewriting replacement sub-area in response to the rewrite request is recorded. The recording method includes a confirming step of, upon a request to write data to the main data area, confirming whether or not the address specified by the write request is an address at which data has been recorded, a determining step of, when it is confirmed in the confirming step that this address is an address at which data has been recorded, determining whether or not the data is rewritable and recordable using the rewriting replacement sub-area and the replacement management sub-area, a first writing step of, when it is confirmed in the confirming step that the address specified by the write request is an address at which no data has been recorded, writing the data to the address specified by the write request, and a second writing step of, when it is confirmed in the confirming step that the address specified by the write request is an address at which data has been recorded and when it is determined in the determining step that the data is rewritable and recordable, writing the data in accordance with the write request to the rewriting replacement sub-area and recording the replacement management information into the replacement management sub-area.

The present invention further provides a playback method for playing back data on a recording medium having a main data area that is a write-once recordable section in which data is writable once, and a management/control area in which management/control information for recording and playing back data on the main data area is recorded, the main data area including a normal record and playback sub-area in which data is recorded and played back, a rewriting replacement sub-area into which written data is recorded in response to a request to rewrite the data recorded in the normal record and playback sub-area, and a replacement management sub-area in which replacement management information between the data that is to be updated in the normal record and playback sub-area according to a rewrite request and the rewritten data that is recorded in the rewriting replacement sub-area in response to the rewrite request is recorded. The playback method includes a confirming step of, upon a request to read data from the main data area, confirming whether or not the address specified by the read request is an address at which data has been rewritten, a first reading step of, when it is confirmed in the confirming step that the address specified by the read request is not an address at which data has been rewritten, reading data from the address specified by the read request, and a second reading step of, when it is confirmed in the confirming step that the address specified by the read request is an address at which data has been rewritten, reading the data in accordance with the read request from the rewriting replacement sub-area based on the replacement management information recorded in the placement management sub-area.

Accordingly, in the present invention, a write-once recording medium has a main data area including a normal record and playback sub-area, a rewriting replacement sub-area, and a replacement management sub-area. In a recording apparatus, upon a request to write data to an address at which data has been recorded in the normal record and playback sub-area, that is, upon an instruction to rewrite the data, the written data is recorded into the rewriting replacement sub-area, and replacement management information that associates the original address with the address in the rewriting replacement sub-area is recorded into the replacement management sub-area. Thus, data rewriting is achieved.

In a playback apparatus, upon a request to read data from an address at which the data has been rewritten in the manner described above, the replacement management information is referred to, and the data is read from the address in the rewriting replacement sub-area that replaces the requested address. Thus, even when data has been rewritten, the rewritten data can be successfully read.

BRIEF DESCRIPTION OF THE DRAWINGS

FIG. 2 is a diagram showing DMAs in the disk of the embodiment.

FIG. 4 is a table showing the description of the DDS in the disk of the embodiment.

FIG. 7 is a table showing list management information that is contained in the ATL in the disk of the embodiment.

FIG. 8 is a diagram showing address transfer information that is contained in the ATL in the disk of the embodiment.

BEST MODE FOR CARRYING OUT THE INVENTION

An optical disk according to an embodiment of the present invention will now be described. A disk drive apparatus (record and playback apparatus) that performs recording and playback of the optical disk will also be described. The description will be made according to the following sequence:

| | |
|---|---|
| 1. | Disk Structure |
| 2. | DMA |
| 3. | ISA and OSA |

-continued

| 4. | Disk Drive Apparatus |
| 5. | Formatting Process |
| 6. | Recording Process |
| 7. | Playback Process |

1. Disk Structure

An optical disk according to an embodiment will first be described. This optical disk is implemented as a write-once disk in the category of high-density optical disks, referred to as DVR (Data & Video Recording).

Example physical parameters of the high-density optical disk according to this embodiment will be described.

The optical disk in this example is 120 mm in diameter and 1.2 mm in thickness. This disk looks like a CD (Compact Disc) disk or a DVD (Digital Versatile Disc) disk.

Under the conditions wherein a so-called blue laser is used as the record/playback laser and a high-NA optical system is used, with a narrow track pitch, a high linear density, etc., user data having a capacity of about 23 Gbytes can be recorded and played back on the 12-cm-diameter disk.

Figure 1:
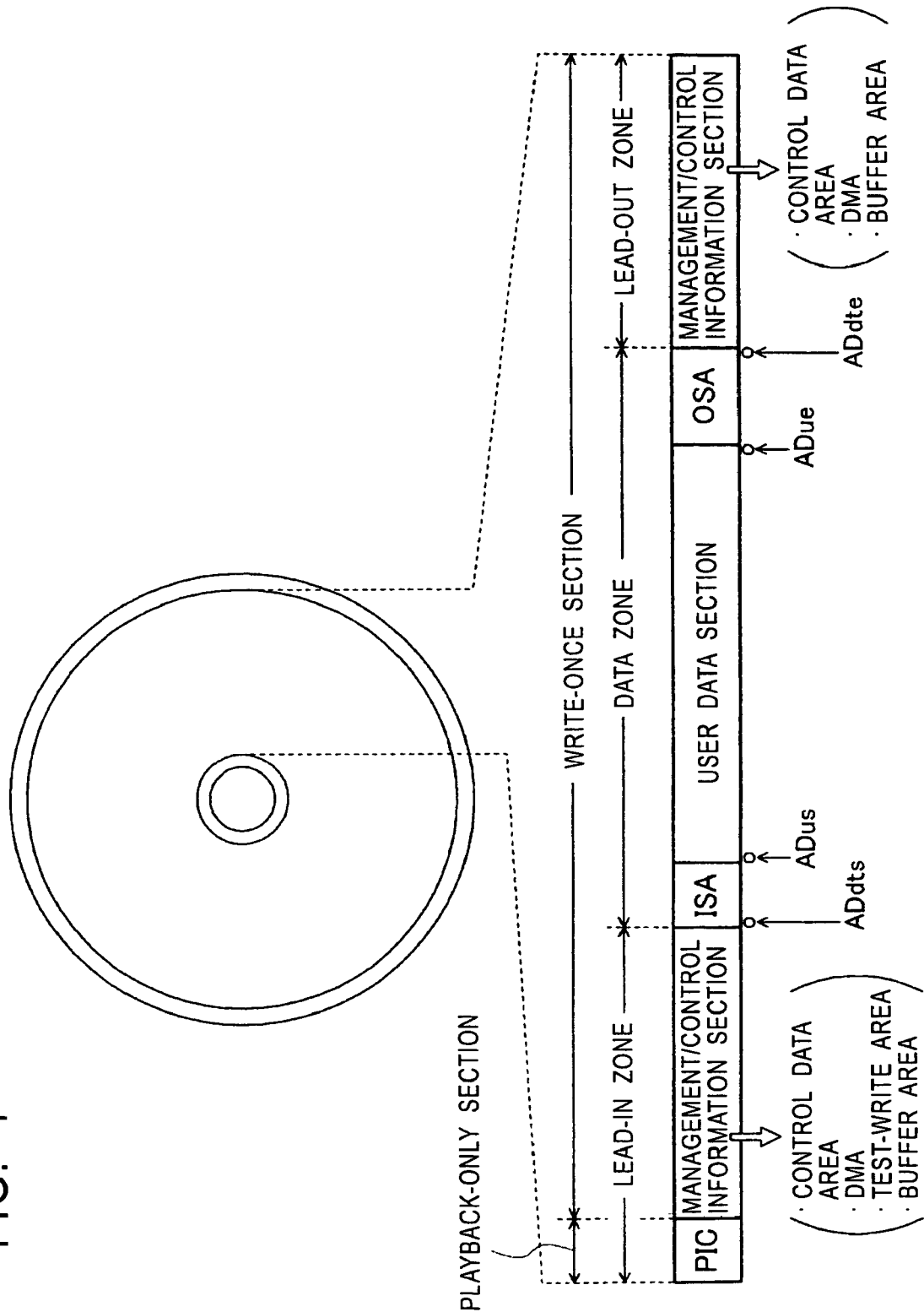
FIG. 1 is a schematic diagram of a disk according to an embodiment of the present invention.

FIG. 1 shows the disk layout (area structure).

A lead-in zone, a data zone, and a lead-out zone reside on the disk, from the inner circumferential side.

In view of the structure of record/playback regions, a pre-recorded information section PIC that resides at the innermost side of the lead-in zone is used as a playback-only section, and the section that extends from a management section in the lead-in zone to the lead-out zone is used as a one-time recordable write-once section.

In the playback-only section and the write-once section, recording tracks that are formed of wobbled grooves are spirally formed. The grooves serve as a tracking guide for laser-spot tracing. The grooves also serve as recording tracks on which data is recorded and played back.

In this example, an optical disk wherein data is recorded in the grooves will be described. However, the present invention is not limited to such a groove-recording optical disk, and may be implemented as a land-recording optical disk wherein data is recorded in lands between the grooves, or a land-groove-recording optical disk wherein data is recorded in the grooves and lands.

The grooves serving as recording tracks are wobbled according to a wobble signals. A disk drive apparatus for such an optical disk irradiates a laser spot onto a groove to detect the position of the edges of this groove from the reflected light thereof, and extracts a shifted component in the radial direction of the disk at the edges, which is caused by moving the laser spot along the recording track, thereby playing back the wobble signals.

A wobble signal includes modulated address information (physical address, other additional information, etc.) of the recording track at the position at which the signal is recorded. The disk drive apparatus demodulates the address information, etc., from the wobble signal, thereby performing address control and the like for data recording or playback.

The lead-in zone shown in FIG. 1 resides in, for example, an inner region that spans 24 mm in radius.

The pre-recorded information section PIC resides in a portion in the lead-in zone, which spans 22.2 mm to 23.1 mm in radius.

The pre-recorded information section PIC has playback-only information recorded in advance thereon in the form of wobbled grooves, including disk information such as recording and playback power requirements, disk region information, information for use in copy protection, and so on. Such information may be recorded in the form of embossed pits or the like.

Although not shown, a BCA (Burst Cutting Area) may reside in a portion further towards the inside than the pre-recorded information section PIC. In the BCA, a unique ID that is unique to the disk recording medium is recorded by a recording method of burning out the recording layer. That is, recording marks are concentrically arranged to produce barcode-type recorded data.

A management/control information section resides a portion in the lead-in zone, which spans, for example, 23.1 mm to 24 mm in radius.

The management/control information section defines a predetermined area format having a control data area, a DMA (Defect (Disc) Management Area), a test-write area, a buffer area, and so on.

The control data area in the management/control information section has the following management/control information recorded thereon: the disk type, the disk size, the disk version, the layer structure, the channel bit length, BCA information, the transfer rate, data zone position information, the recording linear velocity, record/playback laser power information, etc.

The test-write area defined in the management/control information section is used for a test write or the like when the data record/playback conditions, such as laser power during recording/playback, are set. The test-write area is therefore an area for adjusting the record/playback conditions.

The DMA is also defined in the management/control information section. In the field of optical disks, generally, DMA is referred to as a "defect management area" in which replacement management information of a defective area on the disk is recorded. However, the DMA of the disk in this example is not used for replacement management of a defective area (but it can also be used for this), but is used as an area in which management/control information for data rewriting on this write-once disk is recorded. In this sense, this DMA functions as a "disc management area". Particularly in this case, the DMA contains management information for ISA and OSA, as described below.

The details of the DMA are described below.

The data zone resides in an outer portion in the lead-in zone, which spans, for example, 24.0 mm to 58.0 mm in radius. The data zone is a region in which user data is actually recorded and played back. The data zone has a start address ADdts and an end address ADdte, which are indicated by the data zone position information in the control data area described above.

In the data zone, an ISA (Inner Spare Area) resides at the innermost side, and an OSA (Outer Spare Area) resides at the outermost side. As described below, in the disk in this example, the OSA is used as a rewriting replacement area, and the ISA is used as a replacement management area.

The ISA resides at the beginning of the data zone, having a predetermined number of clusters (1 cluster=65536 bytes).

The OSA resides inward from the end of the data zone, having a predetermined number of clusters. The sizes of the ISA and the OSA are defined in the DMA.

In the data zone, a user data section is between the ISA and the OSA. The user data section is a normal record and playback region that is used for normal user data recording and playback.

The location, that is, a start address ADus and an end address ADue, of the user data section, is defined in the DMA.

The lead-out zone resides in a portion further towards the outside than the data zone, which spans, for example, 58.0 mm to 58.5 mm in radius. The lead-out zone is a management/control information section, in which a control data area, a DMA, a buffer area, and so on are formed in a predetermined format. Like the control data area in the lead-in zone, the control data area has, for example, various management/control information recorded thereon. Like the DMA in the lead-in zone, the DMA is provided as a region in which management information for the ISA and OSA is recorded.

2. DMA

The structure of the DMAs recorded in the lead-in zone and the lead-out zone will now be described. As described above, each DMA in this example contains management/control information for managing the ISA and the OSA that enable data to be rewritten to the write-once disk.

FIG. 2 shows a DMA 1 that represents the DMA in the lead-in zone, and a DMA 2 that represents the DMA in the lead-out zone.

In the example shown, the size of each DMA is 32 clusters (32×65536 bytes). It is to be understood that the DMA size is not limited to 32 clusters.

Either the DMA 1 in the lead-in zone or the DMA 2 in the lead-out zone contains pieces of detailed disk information DDSs (disc definition structures) each being composed of one cluster.

The 32 clusters (CL1 to CL32) of the DMA 1 and the 32 clusters (CL1 to CL32) of the DMA 2, i.e., a total of 64 clusters, are retained, in which DDSs DDS#1 to DDS#64 are recorded.

The DDS information has a size of one cluster, and recording of DDS#1 to DDS#64 means that the DDS can be written 64 times. In other words, the DDS itself can be updated 64 times.

Figure 3:
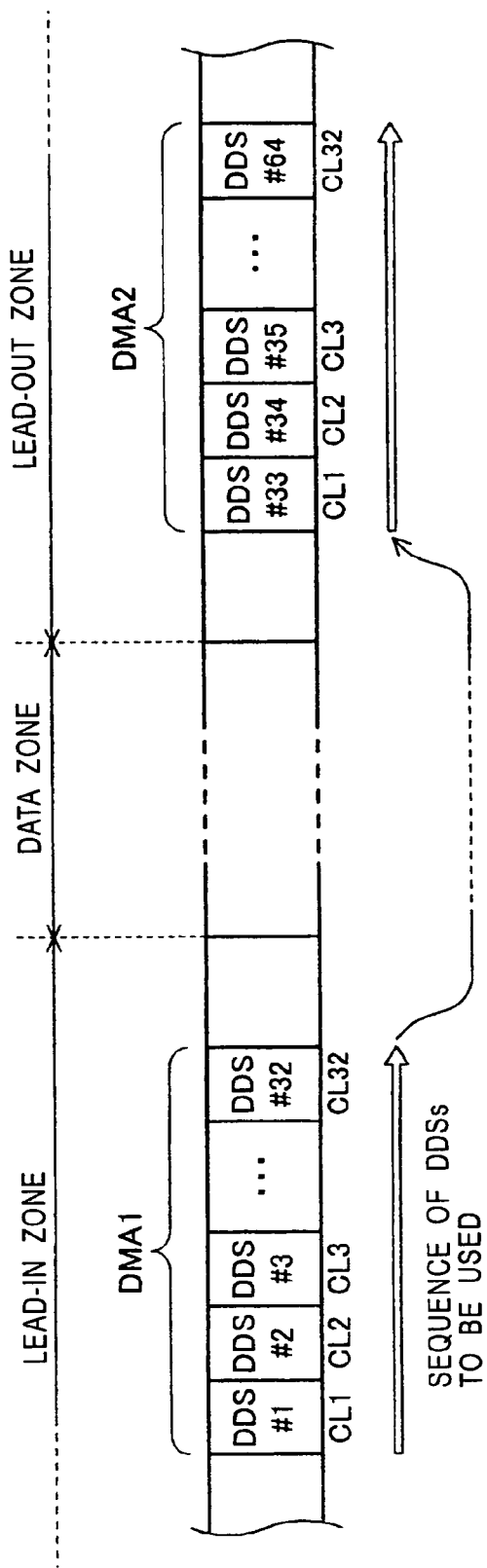
FIG. 3 is a diagram showing the sequence of used DDSs in the disk of the embodiment.

FIG. 3 shows the sequence of use in the DMAs. When the DDS is first written to the DMA, the DDS is recorded as DDS#1 in the cluster CL1 of the DMA 1.

When the DDS is updated, the updated DDS is recorded as DDS#2 in the cluster CL2 of the DMA 1. At this time, DDS#1 is no longer valid.

Thereafter, each time the DDS is updated, the clusters are used in turn according to the sequence shown in FIG. 3 to write a new DDS.

After all 32 clusters of the DMA 1 are used, the clusters of the DMA 2 in the lead-out zone are used in turn from the first cluster to update the DDS.

Thus, the DDS on the outermost side is valid at each time.

The details of the DDS are shown in FIG. 4.

As described above, the DDS has a size of one cluster (=65536 bytes)

In FIG. 4, the first byte of the 65536-byte DDS is indicated by byte 0. The number of bytes indicates the number of bytes necessary for data description.

Two bytes from byte 0 and byte 1 contain a DDS identifier for identifying the DDS cluster.

One byte at byte 2 defines the DDS format number (format version).

Four bytes from byte 32 to byte 35 define the start of the user data section in the data zone, that is, the location of LSN (logical sector number) "0" is defined by PSN (phisical sector number).

Four bytes from byte 36 to byte 39 define the end of the user data area in the data zone, which is defined by LSN (logical sector address).

Four bytes at byte 40 to byte 43 define the size of the ISA (inner spare area) in the data zone.

Four bytes from byte 44 to byte 47 define the size of the OSA (outer spare area) in the data zone.

One byte at byte 52 defines a spare-area availability flag that indicates whether or not data is rewritable using the ISA and the OSA. The spare-area availability flag is used to indicate that the ISA or the OSA is full.

The remaining bytes from byte 3 to byte 31, from byte 48 to byte 51, and from byte 53 to byte 65535 are reserved (undefined) portions.

In this manner, the DDS contains the addresses of the user data section, the size of the ISA and OSA, and the spare-area availability flag. Therefore, the DDS constitutes management/control information for area management of the ISA and OSA in the data zone.

The DDS is updated when the descriptions of the DDS at each time are made different from the actual disk state. More specifically, the DDS is updated when the size of the OSA is changed or the spare-area availability flag is changed.

In other words, the disk in this example is a write-once recording medium that is configured such that the clusters of the DMAs are used as spare areas for the DDS (i.e., management/control information) to substantially update the DDS for managing the data zone.

Since the DDS can be updated, the area sizes of the ISA and the OSA can be flexibly set depending upon the system used or the usage.

Each of the lead-in zone and the lead-out zone may include a plurality of DMAs.

For example, the lead-in zone includes two DMAs, and the lead-out zone includes two DMAs. In this case, the two DMAs in the lead-in zone may be used as the DMA 1 shown in FIG. 2 for DDS#1 to DDS#32, and the two DMAs in the lead-out zone may be used as the DMA 2 shown in FIG. 2 for DDS#33 to DDS#64. This means double writing of the DDS in order to increase data security.

Alternatively, the two DMAs in each of the lead-in zone and the lead-out zone may be used as separate DDS areas, and may be used for DDS#1 to DDS#128. In this case, the DDS can be updated a larger number of times.

3. ISA and OSA

The ISA and the OSA will now be described.

As shown in FIG. 5(a), the ISA resides on the innermost side in the data zone, having a size of M clusters. The OSA resides on the outermost side in the data zone, having a size of X clusters.

The M clusters of the ISA and the X clusters of the OSA are defined as the sizes defined in the DDS. The sizes of the ISA and OSA are defined in the DDS in the manner described above, thereby setting the ISA and the OSA in the data zone. By updating the DDS, for example, the size of the OSA may be increased.

The OSA is a rewriting replacement area into which rewritten data is recorded in response to a request to rewrite the data that is recorded in the user data section, i.e., a normal record/playback region.

The ISA is a replacement management area in which an address transfer list (ATL) that is replacement management information between the data that is to be updated in the user data section according to a rewrite request and the rewritten data that is recorded in the OSA in response to this rewrite request is recorded.

For example, as shown in FIG. 5(a), it is assumed that an address AD1 in the user data section indicates the location in which data has been recorded. When a request to write the data at the address AD1, i.e., a rewrite request, is issued, no data can be written to the address AD1 because of a write-once recording medium. The rewritten data is written to, for example, an address AD2 in the OSA.

Then, the address transfer list ATL including address transfer information that associates the address AD1 with the address AD2 and that indicates that the data at the address AD1 is recorded at the address AD2 is recorded into the ISA.

Accordingly, in rewriting data, the rewritten data is recorded in the OSA, and the data location transfer, which is caused by the rewriting operation, is managed by the address transfer list in the ISA. Thus, the data on a write-once disk would be substantially rewritten (as viewed from, for example, the OS in the host system, the file system, etc.).

The ISA is maintained as an area of M clusters, and one cluster of address transfer list ATL is recorded into the ISA.

As shown in FIG. 5(b), a first address transfer list ATL #1 is recorded in the first cluster of the ISA. Thereafter, each time the address transfer list ATL is updated, the updated address transfer list ATL is recorded as address transfer lists ATL #2, #3, . . . in the subsequent clusters of the ISA in turn, as shown in FIG. 5(b).

The OSA is maintained as a region of X clusters, and rewritten data DT is recorded in the OSA in units of clusters. As shown in FIG. 5(c), the rewritten data DT is recorded in one-cluster regions in turn from the last cluster of the OSA towards the top cluster without intermission.

Figure 6:
FIG. 6 is a table showing the description of ATL in the disk of the embodiment.

FIG. 6 shows the structure of the address transfer list ATL.

The address transfer list ATL has one cluster, i.e., 65536 bytes, by way of example. The byte position indicates the relative position, wherein the top of one cluster is indicated by byte 0.

Sixty-four bytes from byte 0 to byte 63 contain list management information.

Eight bytes from byte 64 to byte 71 contain first address transfer information ati#1.

If N pieces of address transfer information ati is recordable in one address transfer list ATL, the sets of eight bytes of address transfer information ati#2 to ati#N are subsequently recordable.

The remaining bytes from byte (N×8+64) to byte 65535 are reserved portions.

The list management information contained in the 64 bytes from byte 0 to byte 63 has a structure shown in FIG. 7.

Two bytes from byte 0 to byte 1 contain an ATL identifier for identifying the cluster of the address transfer list ATL.

One byte at byte 2 defines the ATL format number (version number).

Four bytes from byte 12 to byte 15 define the number N of pieces of address transfer information ati registered. This is value "N" of the address transfer information ati#1 to ati#N contained at byte 64 and the following bytes, as shown in FIG. 6.

Four bytes from byte 24 to byte 27 define the number of clusters that indicates the size of an unrecorded space in the OSA. The number of clusters also indicates the number of times the data will be rewritable.

The remaining bytes from byte 3 to byte 11, from byte 16 to byte 23, and from byte 28 to byte 63 are reserved portions.

FIG. 8 shows the structure of the address transfer information ati that is registered in the address transfer list ATL.

As described above, the address transfer information ati is information having 8 bytes (i.e., 64 bits b0 to b63).

Figure 5:
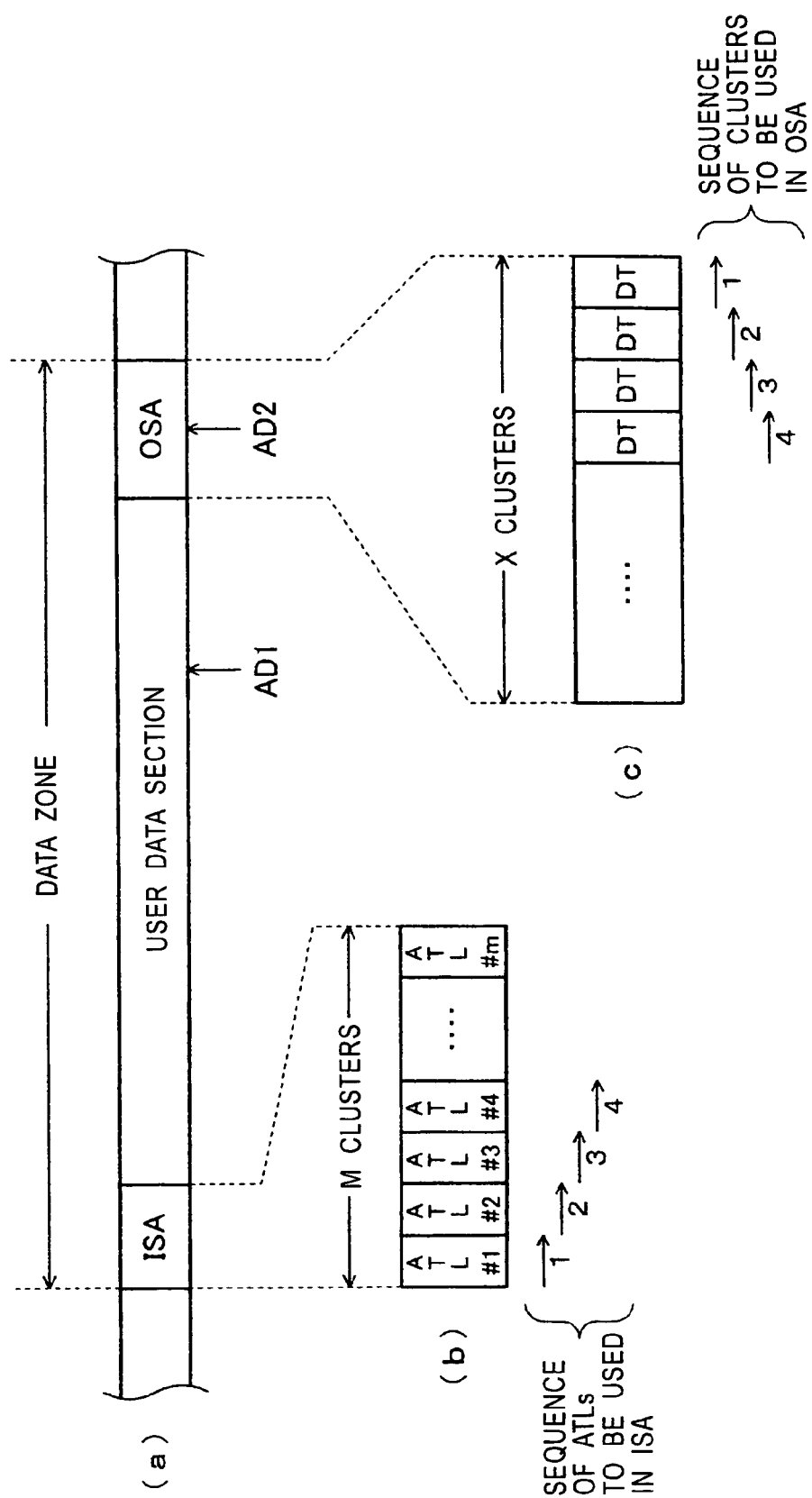
FIG. 5 is a diagram showing ISA and OSA in the disk of the embodiment.

The bits b32 to b59 show the address at which the data is requested to be rewritten (overwritten), which is indicated by a physical sector address. For example, the address AD1 shown in FIG. 5 is shown.

The bits b0 to b31 show the address of the OSA at which the rewritten data is actually written, which is indicated by a physical sector address. For example, the address AD2 shown in FIG. 5 is shown.

The bits b60 to b63 and the bits b28 to b31 are reserved, and are all set to "0".

The address transfer list ATL having the structure described above is recorded in the ISA. Thus, it can be appropriately managed that the data that is rewritten to an address in the user data section is recorded into the OSA.

4. Disk Drive Apparatus

A disk drive apparatus that supports the write-once disk described above will now be described.

The disk drive apparatus in this example formats a write-once disk, for example, a disk in which only the pre-recorded information section PIC shown in FIG. 1 is formed, wherein no data is recorded in the write-once section, thus achieving the disk layout shown in FIG. 1. The disk drive apparatus also records and plays back data on the user data section of the disk that is formatted in this manner.

As is to be understood, the disk drive apparatus also performs recording/updating into the DMA, the ISA, and the OSA during the formatting operation, or if necessary.

Figure 9:
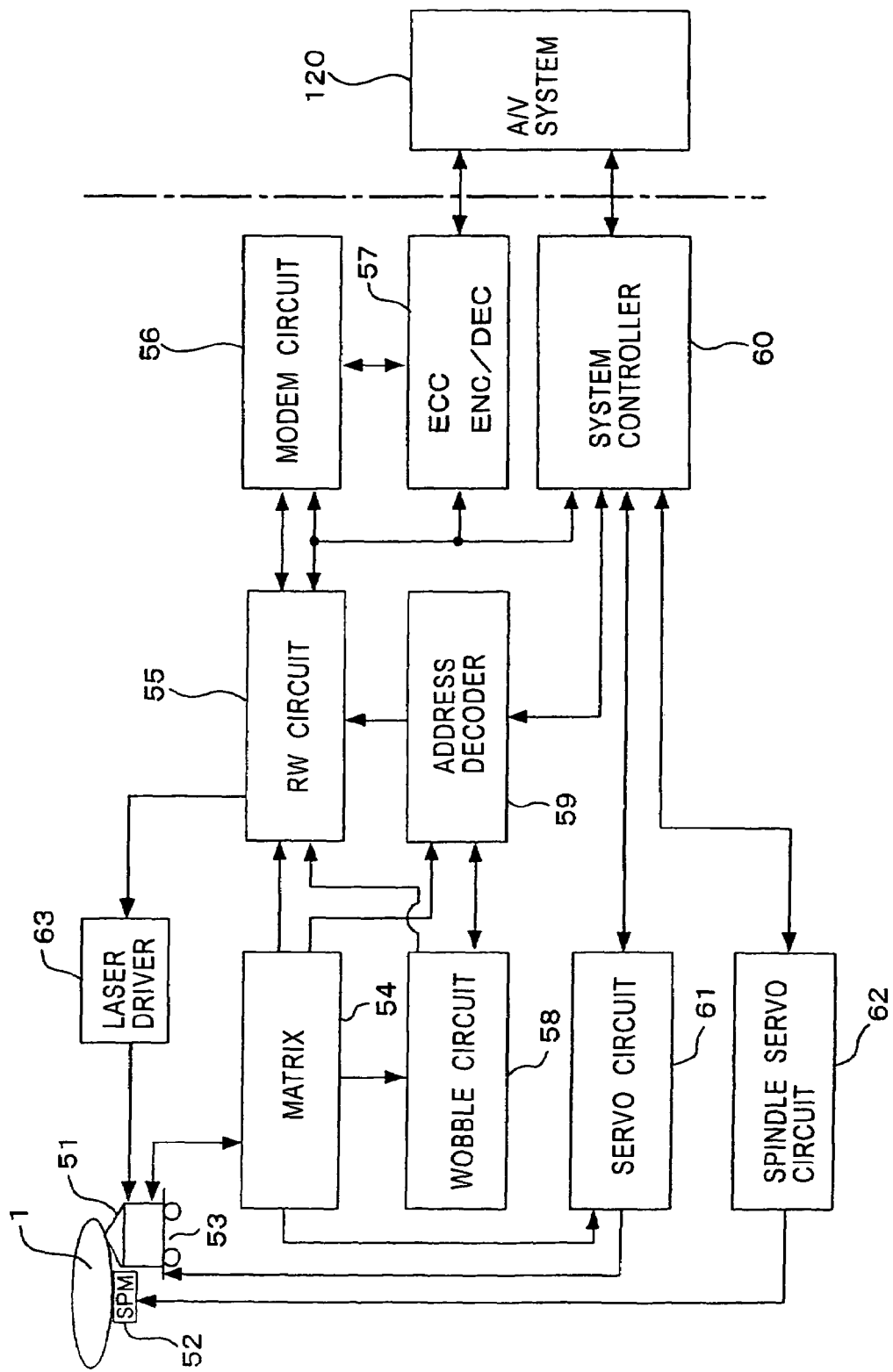
FIG. 9 is a block diagram of a disk drive apparatus according to the embodiment.

FIG. 9 shows the configuration of the disk drive apparatus.

A disk 1 is the write-once disk described above. The disk 1 is mounted on a turntable (not shown), and is rotated by a spindle motor 52 at a constant linear velocity (CLV) during recording/playback.

An optical pickup (optical head) 51 picks up the ADIP address that is embedded as a wobbled groove track in the disk 1, and the management/control information serving as pre-recorded information.

During initial formatting or user-data recording, management/control information or user data is recorded into tracks in the write-once section by the optical pickup. During playback, the recorded data is picked up by the optical pickup.

The pickup 51 includes a laser diode serving as a laser source, a photodetector for detecting reflected light, an objective lens from which a laser beam is output, and an optical system (not shown) that irradiates the laser beam onto a disk recording surface via the objective lens and that guides the reflected light to the photodetector.

The objective lens in the pickup 51 is held so as to be movable in the tracking direction and the focusing direction by a two-axis mechanism.

The overall pickup 51 is movable in the radial direction of the disk by a sled-mechanism 53.

The laser diode in the pickup 51 is driven by a drive signal (drive current) from a laser driver 63 to emit laser light.

The reflected-light information from the disk 1 is detected by the photodetector in the pickup 51, and is converted into an electrical signal according to the amount of received light, which is then supplied to a matrix circuit 54.

The matrix circuit 54 includes a current-to-voltage converter circuit, a matrix computation/amplification circuit, and so on for supporting the output currents from a plurality of light-receiving devices serving as the photodetectors, which are subjected to matrix computation to generate necessary signals.

For example, a high-frequency signal (playback data signal) corresponding to playback data, a focus error signal for servo control, a tracking error signal, and so on are generated.

A signal corresponding to the wobbled grooves, that is, a push-pull signal that is a signal for detecting a wobbled portion, is also generated.

In some cases, the matrix circuit 54 is integrated into the pickup 51.

The playback data signal output from the matrix circuit 54 is supplied to a reader/writer circuit 55. The focus error signal and the tracking error signal are supplied to a servo circuit 61, and the push-pull signal is supplied to a wobble circuit 58.

The reader/writer circuit 55 performs processing on the playback data signal to obtain binary data, to generate playback clocks using a PLL, and so forth. In this way, the reader/writer circuit 55 plays back the data that is picked up by the pickup 51, and supplies the resulting data to a modem circuit 56.

The modem circuit 56 has the function of decoding data in playback, and the function of encoding data in recording.

In decoding during playback, the modem circuit 56 performs demodulation of run-length limited code based on the playback clocks.

An ECC encoder/decoder 57 performs ECC encoding to perform error correcting coding in recording, and performs ECC decoding to perform error correction in playback.

In playback, the ECC encoder/decoder 57 captures the data demodulated by the modem circuit 56 in an internal memory, and performs error detecting/correcting processing, de-interleaving, and the like to obtain playback data.

The data decoded into the playback data by the ECC encoder/decoder 57 is read according to an instruction from a system controller 60, and is then transferred to a device connected thereto, for example, an A/V (Audio-Visual) system 120.

The push-pull signal that is output as a wobbled-groove signal from the matrix circuit 54 is processed by the wobble circuit 58. The push-pull signal, which is ADIP information, is demodulated by the wobble circuit 58 into a data stream constituting an ADIP address, and the demodulated signal is supplied to an address decoder 59.

The address decoder 59 decodes the supplied data to obtain the address value, and supplies it to the system controller 60.

The address decoder 59 further generates clocks by performing PLL processing on the wobble signals from the wobble circuit 58, and supplies the clocks to the components as, for example, encoding clocks for recording.

The push-pull signal that is output as the push-pull signal from the matrix circuit 54 as a wobbled-groove signal and that is pre-recorded information PIC is bandpass-filtered by the wobble circuit 58, and the resulting data is supplied to the reader/writer circuit 55, where the supplied data is converted into a binary data bit stream. The resulting data bit stream is ECC decoded and de-interleaved by the ECC encoder/decoder 57, and the pre-recorded information is extracted. The extracted pre-recorded information is supplied to the system controller 60.

The system controller 60 performs various operation settings, copy protection processing, etc., based on the read pre-recorded information.

In recording, recording data is transferred from the A/V system 120. This recording data is sent to a memory of the ECC encoder/decoder 57 for buffering.

The ECC encoder/decoder 57 performs encoding on the buffered recording data, such as error correcting coding, interleaving, and sub-coding.

The ECC encoded data is modulated by the modem circuit 56 according to, for example, RLL (1-7) PP, and the resulting data is supplied to the reader/writer circuit 55.

The encoding clocks serving as reference clocks for encoding in recording employ the clocks that are generated from the wobble signals in the manner described above.

The recording data that is generated by encoding is subjected to recording compensation by the reader/writer circuit 55 to finely adjust the optimal recording power for the properties of the recording layer, the configuration of the laser spot, the recording linear velocity, etc., to adjust the laser drive pulse waveform, or the like. Then, the resulting data is sent as laser drive pulses to the laser driver 63.

In the laser driver 63, the supplied laser drive pulses are applied to the laser diode in the pickup 51 to activate laser beam emission. Thus, pits are formed in the disk 1 according to the recording data.

The laser driver 63 includes a so-called APC (auto power control) circuit for controlling the laser output so as to become constant irrespective of the temperature or the like, while monitoring the laser output power that is output from a laser power monitoring detector in the pickup 51. The target laser outputs in recording and playback are defined by the system controller 60. In recording and playback, the respective laser output levels are controlled so as to reach the target values.

The servo circuit 61 generates focus, tracking, and sled servo drive signals from the focus error signal and tracking error signal from the matrix circuit 54 to execute servo operations.

Specifically, the focus drive signal and the tracking drive signal are generated based on the focus error signal and the tracking error signal to drive a focusing coil and a tracking coil of the two-axis mechanism in the pickup 51. Thus, a tracking servo loop and a focus servo loop are established by the pickup 51, the matrix circuit 54, the servo circuit 61, and the two-axis mechanism.

The servo circuit 61 turns off the tracking servo loop in response to a track-jump instruction from the system controller 60, and outputs a jump-drive signal to jump the track.

The servo circuit 61 further generates a sled error signal that is obtained as a low-frequency component of the tracking error signal, or a sled-drive signal based on access execution control or the like from the system controller 60 to drive the sled mechanism 53. The sled mechanism has a mechanism (not shown) including a main shaft for holding the pickup 51, a sled motor, a transmission gear, and so on. The sled motor is driven according to the sled-drive signal to slide the pickup 51 as required.

A spindle servo circuit 62 controls the spindle motor 52 to perform CLV rotation.

The spindle servo circuit 62 obtains the clocks that are generated by performing PLL processing on the wobble signals as the current rotational velocity information of the spindle motor 52, and compares the obtained information with predetermined CLV reference velocity information to generate a spindle error signal.

In playing back data, the playback clocks (the reference clocks for decoding) that are generated by PLL in the reader/writer circuit 55 constitute the current rotational velocity information of the spindle motor 52. This information may be compared with predetermined CLV reference velocity information to generate a spindle error signal.

The spindle servo circuit 62 outputs a spindle drive signal that is generated according to the spindle error signal, and drives the spindle motor 52 to perform CLV rotation.

The spindle servo circuit 62 further generates a spindle drive signal according to a spindle kick/brake control signal from the system controller 60, and drives the spindle motor 52 to start, stop, accelerate, decelerate, and so forth.

The operations of such a servo system and record/playback system are controlled by the system controller 60 that is implemented by a microcomputer.

The system controller 60 performs various processing in response to commands from the A/V system 120.

For example, when a write command is sent from the A/V system 120, first, the system controller 60 moves the pickup 51 to the address to be written. Then, the data (for example, MPEG-2 video data, audio data, or the like) that is transferred from the A/V system 120 is encoded by the ECC encoder/decoder 57 and the modem circuit 56 in the manner described above. As described above, the laser drive pulses from the reader/writer circuit 55 are supplied to the laser driver 63, thus activating recording.

For example, when a read command to transfer data (MPEG-2 vide data or the like) that is recorded in the disk 1 is supplied from the A/V system 120, first, seeking control for the specified address is performed. Specifically, the servo circuit 61 is instructed that the pickup 51 accesses the target address that is specified by the seek command.

Then, operation control necessary for transferring the data of the specified data section to the A/V system 120 is performed. Specifically, data is picked up from the disk 1, and is then decoded/buffered, etc., by the reader/writer circuit 55, the modem circuit 56, and the ECC encoder/decoder 57 to transfer the requested data.

In recording and playing back data, the system controller 60 may use the ADIP address that is detected by the wobble circuit 58 and the address decoder 59 to perform accessing or record/playback control.

At a certain time, for example, when the disk 1 is loaded, the system controller 60 performs reading of the unique ID that is recorded in the BCA in the disk 1 (if the BCA is formed) or the pre-recorded information (PIC) that is recorded as wobbled grooves in the playback-only section.

In this case, first, seek control for the BCA or a pre-recorded data zone PR is performed. Specifically, the servo circuit 61 is instructed that the pickup 51 accesses the innermost portion of the disk.

Then, the pickup 51 performs a playback trace to obtain the push-pull signal, which is reflected-light information. The wobble circuit 58, the reader/writer circuit 55, and the ECC encoder/decoder 57 perform decoding to obtain playback data, which is BCA information or pre-recorded information.

Based on the read BCA information or pre-recorded information, the system controller 60 performs laser power settings, copy protection processing, and so on.

Although the disk drive apparatus that is connected to the A/V system 120 is shown in FIG. 9, the disk drive apparatus of the present invention may be connected to, for example, a personal computer or the like.

The disk drive apparatus of the present invention is not necessarily connected to another device. In this case, an operation unit or a display unit is additionally provided, or the data input/output interface is different from that shown in FIG. 9. That is, recording and playback are carried out in response to a user operation, and terminals for inputting and outputting various data are provided.

A variety of configurations may be conceivable. For example, the disk drive apparatus of the present invention may be implemented as a recording-only device and a playback-only device.

5. Formatting Process

The write-once disk 1 used in this disk drive apparatus may be shipped from the factory in the unformatted form. The write-once disk 1 in the unformatted form only contains the pre-recorded information that is defined as wobbled grooves in the playback-only section shown in FIG. 1, the ADIP address that is defined as wobbled grooves in the write-once section, and the like.

Thus, before the disk 1 is used, the disk 1 is formatted to form the management section in the lead-in zone, as described above, and to set the ISA and the OSA in the data zone based on the information recorded in the DDS of the DMA.

Figure 10:
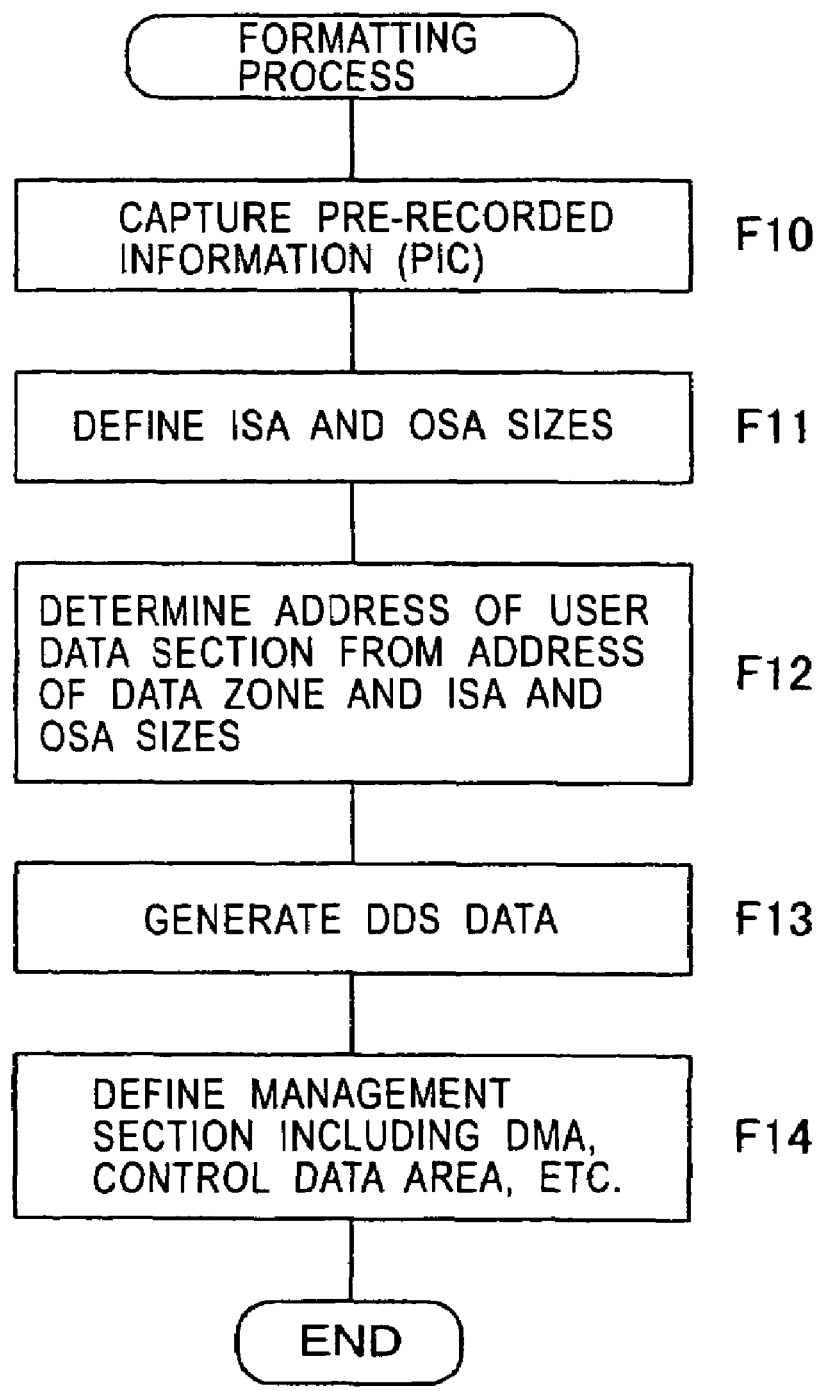
FIG. 10 is a flowchart showing a formatting process according to the embodiment.

FIG. 10 shows a control process of the system controller 60 for this formatting process.

In a formatting operation, first, in step F10, pre-recorded information is captured. The system controller 60 causes the pickup 51 to access the disk innermost portion to capture pre-recorded information. Based on the captured pre-recorded information, the system controller 60 obtains basic information of the disk 1.

In step F11, the sizes of the ISA and the OSA are defined. The sizes of the ISA and the OSA may be set to fixed values in advance by a formatting program in the system controller 60, or may be instructed by, for example, the A/V system 120 or an application, OS, or the like of a personal computer that is connected thereto.

In step F12, the start address ADus and the end address ADue of the user data section are determined from the address of the data zone and the sizes of the ISA and the OSA defined in step F11.

The start address ADdts and the end address ADdte of the data zone are recorded in, for example, the pre-recorded information, and are thus recognized by the system controller 60. The start address ADus of the user data section is given by adding the number of clusters of the ISA to the start address ADdts of the data zone. The end address ADue of the user data section is given by subtracting the number of clusters of the OSA from the end address ADdte of the data zone.

In steps F11 and F12, the description of the DDS (see FIG. 4) in the DMA is determined, and, in step F13, first DDS data, i.e., DDS#1, is generated.

In step F14, the DMA including the DDS data DDS#1, the management/control information of the control data area, etc., are recorded in the management section in the lead-in zone. Specifically, the management section is generated so as to contain the DMA that has the DDS data DDS#1 recorded in the first cluster and the information of the control data area that is generated based on the pre-recorded information and the like while maintaining a test-write area and a buffer area.

Therefore, the formatted disk shown in FIG. 1 is obtained.

The formatting process described above may be performed by a formatting disk drive apparatus before the disk is shipped.

6. Recording Process

Figure 11:
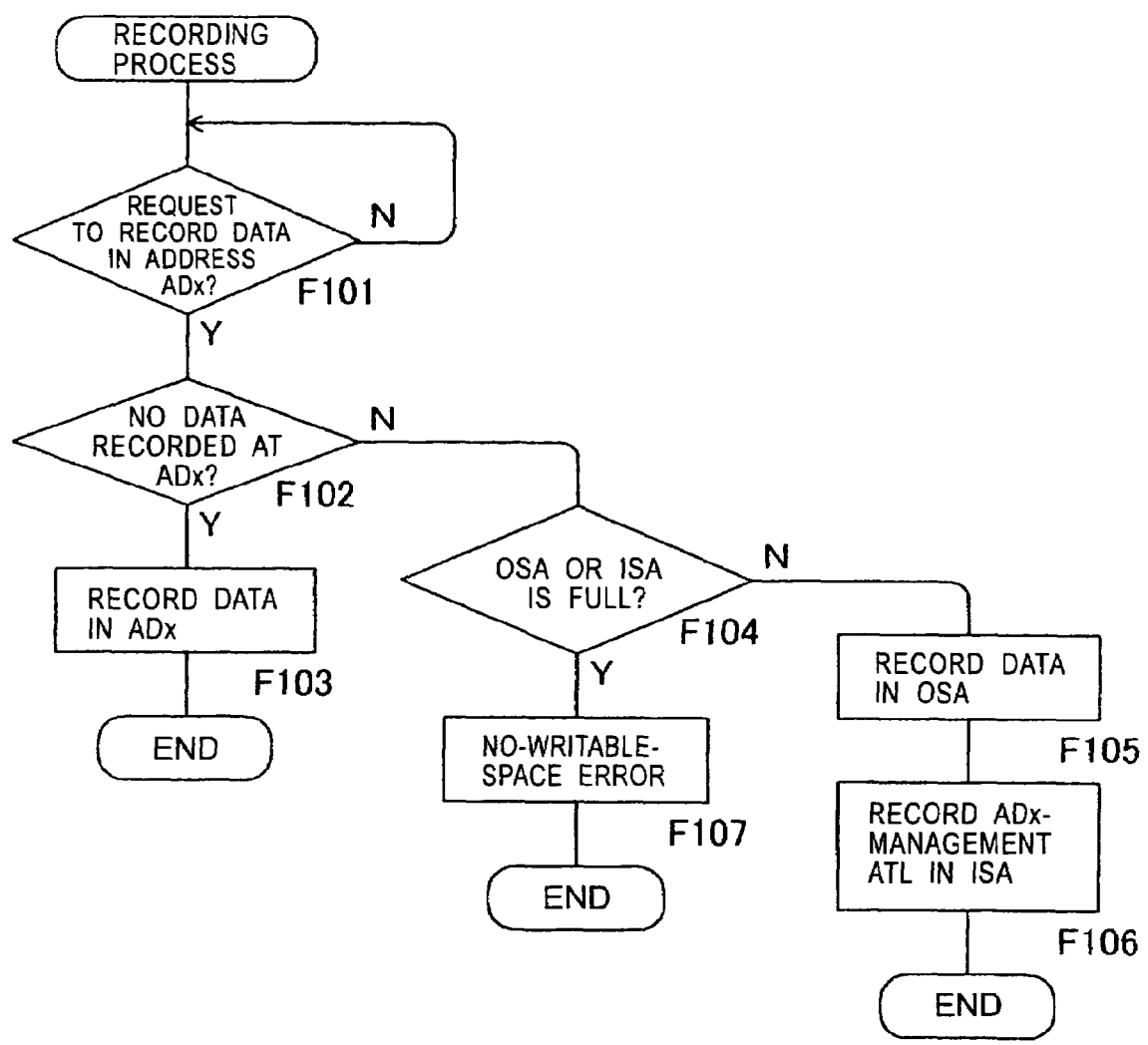
FIG. 11 is a flowchart showing a recording process according to the embodiment.

The processing of the system controller 60 when data is recorded onto the disk 1 by the disk drive apparatus will now be described with reference to FIG. 11.

It is assumed that a request to write data at the logical sector address ADx(L) is sent to the system controller 60 from a host device such as the A/V system 120.

The process proceeds from step F101 to step F102, in which the system controller 60 first determines whether or not the logical sector address ADX(L) is an address at which data has been recorded.

In this case, first, the specified logical sector address ADx(L) is converted into a physical sector address ADx(P).

The physical sector address ADX(P) is determined by adding a "start physical sector address of the user data section", which is recorded in the DDS, to the logical sector address ADx(L).

Then, it is determined whether or not the physical sector address ADx(P) is an address at which data has been recorded.

If this physical sector address ADX(P) is an address at which no data has been recorded, the process proceeds from step F102 to step F103, in which data is recorded in the physical sector address ADx(P). Then, the process ends.

This is a standard recording process for the user data section.

If the physical sector address ADX(P) specified by the write request is an address at which data has been recorded, the process proceeds from step F102 to step F104, in which it is determined whether or not either the OSA or the ISA is full. This determination is performed using the spare-area availability flag of the DDS shown in FIG. 4. Whether or not the OSA is full may also be determined by checking the number of clusters available in the OSA in the list management information of the ISA shown in FIG. 7.

If both the ISA and the OSA have an empty space, the process of the system controller 60 proceeds from step F104 to step F105, in which the pickup 51 accesses the OSA to record the data, which is requested to be written at the physical sector address ADx(P), at the empty address in the OSA, that is, the address that is determined according to the writing sequence of the data DT shown in FIG. 5(c).

In step F106, data is recorded in the ISA, if necessary.

If the address of the OSA at which the data is recorded in step F105 is indicated by ADx(OSA), in step F106, a new address transfer list ATL in which the address transfer information ati (see FIG. 8) that includes the physical sector address ADX(P) as the original physical sector address and the address ADX(OSA) as the replaced physical sector address is added to the address transfer list ATL (see FIG. 6) and in which the number of clusters available in the OSA is updated in the list management information (see FIG. 7) is recorded in the ISA.

After the address transfer list ATL contained in the ISA is updated, the processing in response to the write request ends. Accordingly, the system controller 60 can support a request to write data at a recorded address, that is, a rewrite request, using the ISA and the OSA.

If either the OSA or the ISA is full in step F104, and the rewritten data is not recordable or the address transfer list ATL is not updatable, this write request cannot be supported. The process proceeds from step F104 to step F107, in which an error indicating that there is no writable space is returned to the host system, and the process ends.

7. Playback Process

Figure 12:
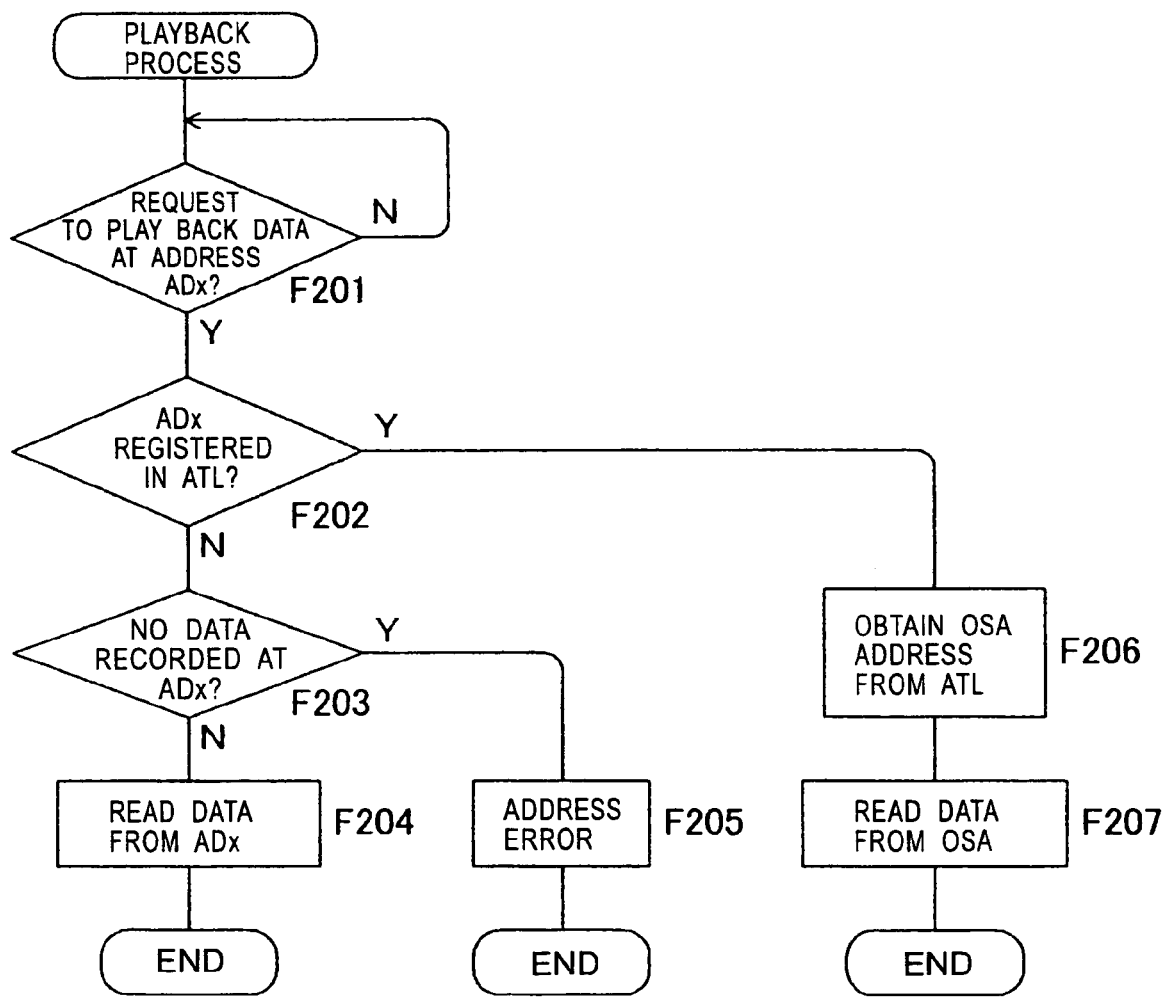
FIG. 12 is a flowchart showing a playback process according to the embodiment.

The processing of the system controller 60 when data is played back on the disk 1 by the disk drive apparatus will now be described with reference to FIG. 12.

It is assumed that a request to read data from the logical sector address ADx(L) is sent to the system controller 60 from a host device such as the A/V system 120.

The process proceeds from step F201 to step F202, in which the system controller 60 determines whether or not the data at the logical sector address ADx(L) has been rewritten, that is, whether or not this address has been registered in the address transfer list ATL.

In this case, first, the specified logical sector address ADx(L) is converted into a physical sector address ADx(P).

Then, it is determined whether or not the physical sector address ADX(P) has been registered as the original physical sector address in any address transfer information ati in the address transfer list ATL.

If the physical sector address ADX(P) has not been registered in the address transfer list ATL, the process proceeds from step F202 to step F203, in which it is determined whether or not the physical sector address ADx(P) is an address at which data has been recorded.

If this address is an address at which no data has been recorded, in step F205, an address error is returned to the host, and the process ends.

If the physical sector address ADx(P) is an address at which data has been recorded, in step F204, the data is played back from the physical sector address ADx(P), and the process ends.

This is a standard playback process for the user data section.

If the physical sector address ADx(P) specified by write request has been registered in the address transfer list ATL in step F202, the process proceeds from step F202 to step F206, in which the replaced physical sector address ADx (OSA) is read from the corresponding address transfer information ati in the address transfer list ATL. This address is an OSA address.

In step F207, the system controller 60 reads the data from the address ADx(OSA) in the OSA that is registered as the replaced physical sector address, and the read data is transferred to a host device such as the A/V system 120. Then, the process ends.

Accordingly, after data is rewritten, in response to a request to play back the rewritten data, the latest data can be appropriately played back and transferred to a host device.

According to the disk and disk drive apparatus of the embodiment described above, a write-once disk capable of supporting a write request to the same address and capable of using a file system that is not available in a traditional write-once disk is achieved. A file system compatible with various types of OS, such as FAT file systems, can be immediately used to exchange data without being aware of the difference in OS.

As is to be understood, it is possible to rewrite not only user data but also directory information, such as FAT, that is recorded in the user data section. Therefore, file systems in which directory information and the like are updated occasionally, such as FAT file systems, are suitably applied.

In the A/V system 120, video data or audio data would be updated in such a medium as long as a recordable area is left in the ISA or the OSA.

In the foregoing description, the ISA and the OSA are used for data rewriting, whereas, the ISA and the OSA may also be used as spare areas for a defective area. If there is a defective-area address on the disk, the data to be written to this address is recorded at an address in the OSA, and both addresses are registered as address transfer information ati in the ISA.

While a disk according to an embodiment and a disk drive apparatus for the disk have been described, the present invention is not limited to the examples described above, and a variety of modifications may be made without departing from the scope of the invention.

For example, the recording medium of the present invention may be implemented as recording media other than optical disk media.

As is understood from the foregoing description, the present invention achieves the following advantages:

According to the present invention, in a write-once recording medium, a main data area (i.e., a data zone) has a normal record and playback sub-area (i.e., a user data section), a rewriting placement sub-area (i.e., an OSA), and a replacement management sub-area (i.e., an ISA). Upon a request to write data to an address at which data has been recorded in the normal record and playback sub-area, that is, upon an instruction to rewrite data, the rewritten data is recorded in the rewriting replacement sub-area, and replacement management information (i.e., an ATL) that associates the original address with the address in the rewriting replacement sub-area is recorded in the replacement management sub-area. Thus, data rewriting is achieved. Upon a request to read data from an address at which the data has been rewritten in the manner described above, the replacement management information is referred to, and the data is read from the address in the rewriting replacement sub-area that replaces the requested address. Thus, even when data has been rewritten, the rewritten data can be successfully read.

According to the present invention, therefore, a write-once recording medium can be substantially used as a data rewritable recording medium. Such a write-once recording medium can support file systems compatible with rewritable recording media, such as FAT systems. Thus, advantageously, write-once recording media with remarkably high usability is achieved.

A FAT file system, which is a standard file system in an information processing device such as a personal computer, supports recording and playback on rewritable recording media from various types of OS (operating system). According to the present invention, a write-once recording medium can immediately support the FAT file system to exchange data without being aware of the different in OS.

Moreover, according to the present invention, as long as there is left a recordable area, a write-once recording medium can be used as a data writable recording medium. Thus, advantageously, write-once recording media can effectively be used, and waste of resources can be avoided.

The sizes of the rewriting replacement sub-area and the replacement management sub-area are defined by the management/control information (i.e., a DDS) that is recorded in the management/control area. Thus, the size of the rewriting replacement sub-area or the replacement management sub-area can be flexibly set depending upon the system used or the usage by setting or updating the management/control information.

Moreover, the management/control information that is recorded in the management/control area includes information indicating whether or not the rewriting replacement sub-area and the replacement management sub-area are available. Thus, an apparatus, such as a recording apparatus, can easily and correctly determine rewritability.

In a case where the management/control section is also a write-once recordable area, the management/control section includes a management/control-information replacement sub-area for updating the management/control information (i.e., a DDS) for the rewriting replacement sub-area and the replacement management sub-area. Thus, the management/control information can be updated.

The invention claimed is:

1. A recording medium having a main data area that is a write-once recordable section in which data is physically writable once, and a management/control area in which management/control information for recording and playing back data on the main data area by a recording apparatus is recorded, wherein the main data area of the write-once recordable section includes:
a normal record and playback sub-area in which data is recorded and played back;
a rewriting replacement sub-area into which rewritten data is recorded in response to a request to rewrite a portion of the data recorded in the normal record and playback sub-area so as to logically overwrite the portion of the data; and
a replacement management sub-area in which is recorded, in response to the request, replacement management information for managing, by the recording apparatus, the portion of the data in the normal record and playback sub-area according to the rewrite request and the rewritten data that is recorded in the rewriting replacement sub-area in response to the rewrite request.

2. A recording medium according to claim 1, wherein the sizes of the rewriting replacement sub-area and the replacement management sub-area are defined by the management/control information recorded in the management/control area.

3. A recording medium according to claim 1, wherein the management/control information recorded in the management/control area includes information indicating whether or not the rewriting replacement sub-area and the replacement management sub-area are available.

4. A recording medium according to claim 1, wherein the management/control area is a write-once recordable section in which data is writable once, and includes a management/control-information replacement sub-area for updating the management/control information for the rewriting replacement sub-area and the replacement management sub-area.

5. A recording apparatus for a recording medium having a write-once recordable section in which data is physically writable once, the write-once recordable section including a main data area and a management/control area in which management/control information for recording and playing back data on the main data area is recorded, said recording apparatus comprising:

writing means for writing data; and
formatting control means for causing the writing means to record the management/control information in the management/control area so as to form in the main data area of the write-once recordable section,
a normal record and playback sub-area in which data is recorded and played back;
a rewriting replacement sub-area into which rewritten data is recorded in response to a request to rewrite a portion of the data recorded in the normal record and playback sub-area so as to logically overwrite the portion of the data; and
a replacement management sub-area in which is recorded, in response to the request, replacement management information for managing the portion of the data in the normal record and playback sub-area according to a rewrite request and the rewritten data that is recorded in the rewriting replacement sub-area in response to the rewrite request.

6. A recording method for recording data onto a recording medium having a write-once recordable section in which data is physically writable once, the write-once recordable section including a main data area and a management/control area in which management/control information for recording and playing back data on the main data area is recorded, wherein the management/control information is recorded in the management/control area, the method comprising:

recording data to a normal record and playback sub-area of the main data area of the write-once recordable section;

recording rewritten data into a rewriting replacement sub-area in response to a request to rewrite a portion of the data recorded in the normal record and playback sub-area so as to logically overwrite the portion of the data; and recording, in response to the request, replacement management information to a replacement management sub-area, the replacement management information being information for managing the portion of the data in the normal record and playback sub-area according to a rewrite request and the rewritten data that is recorded in the rewriting replacement sub-area in response to the rewrite request.

7. A recording apparatus for a recording medium having a write-once recordable section in which data is physically writable once, the write-once recordable section including a main data area and a management/control area in which management/control information for recording and playing back data on the main data area is recorded, said recording apparatus comprising:

a writing circuit configured to write data; and a controller configured to cause the writing means to record the management/control information in the management/control area so as to form in the main data area of the write-once recordable section, a normal record and playback sub-area in which data is recorded and played back;

a rewriting replacement sub-area into which rewritten data is recorded in response to a request to rewrite a portion of the data recorded in the normal record and playback sub-area so as to logically overwrite the portion of the data; and a replacement management sub-area in which is recorded, in response to the request, replacement management information for managing the portion of the data in the normal record and playback sub-area according to a rewrite request and the rewritten data that is recorded in the rewriting replacement sub-area in response to the rewrite request.

* * * * *